United States Patent
Terada et al.

(10) Patent No.: US 10,305,118 B2
(45) Date of Patent: May 28, 2019

(54) FUEL CELL SEPARATOR AND METHOD FOR PRODUCING THE SAME

(71) Applicant: HONDA MOTOR CO., LTD., Minato-Ku, Tokyo (JP)

(72) Inventors: Satoru Terada, Utsunomiya (JP); Yuki Hama, Utsunomiya (JP); Masahiro Matsutani, Utsunomiya (JP); Akihito Giga, Utsunomiya (JP); Takehiro Mugishima, Utsunomiya (JP); Mayu Kurata, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 599 days.

(21) Appl. No.: 14/224,806

(22) Filed: Mar. 25, 2014

(65) Prior Publication Data

US 2014/0295321 A1 Oct. 2, 2014

(30) Foreign Application Priority Data

Mar. 29, 2013 (JP) .................. 2013-075301
Feb. 25, 2014 (JP) .................. 2014-034185

(51) Int. Cl.
*H01M 8/02* (2016.01)
*H01M 8/0206* (2016.01)
(Continued)

(52) U.S. Cl.
CPC ....... *H01M 8/0206* (2013.01); *H01M 8/0215* (2013.01); *H01M 8/0228* (2013.01);
(Continued)

(58) Field of Classification Search
CPC ............. H01M 8/0206; H01M 8/0228; H01M 8/0271; H01M 8/0267; H01M 8/0215; H01M 8/0284
See application file for complete search history.

(56) References Cited

U.S. PATENT DOCUMENTS 7,892,695 B2  2/2011  Kato
9,425,450 B2  8/2016  Jeon et al.
(Continued)

FOREIGN PATENT DOCUMENTS

AT             11 555 U1    12/2010
DE  11 2006 000 501 T5     1/2008
(Continued)

OTHER PUBLICATIONS

Composition ranges for 316 grade of stainless steels, from Retrieved from: http://www.azom.com/article.aspx?ArticleID=863 on Aug. 22, 2016.*

(Continued)

*Primary Examiner* — Philip A. Stuckey
(74) *Attorney, Agent, or Firm* — Carrier Blackman & Associates, P.C.; Joseph P. Carrier; William D. Blackman

(57) ABSTRACT

First, a passive film is removed from a surface of a separator sheet. For example, the separator sheet may be immersed in an acidic liquid to remove the passive film. Then, the separator sheet is washed with water, taken out from the water, and heated. After the heating, the separator sheet is subjected to an electrolytic treatment to obtain a separator for a fuel cell. The resultant separator has a seal forming portion, and the outermost surface of the seal forming portion contains, based on 100% by weight of the total of a Cr oxide, an Mo oxide, an Fe oxide, Fe, and Ni, 5% by weight or less of the sum of the Fe and Ni and 60% by weight or more of the Cr oxide.

13 Claims, 8 Drawing Sheets

| No. | Sum of Fe and Ni ratios [% by weight] | Peeling start time [hr] | Evaluation |
|-----|---------------------------------------|-------------------------|------------|
| 1   | 3                                     | 3000                    | ○          |
| 2   | 5                                     | 2500                    | ○          |
| 3   | 8                                     | 1800                    | △          |
| 4   | 10                                    | 1600                    | △          |
| 5   | 13                                    | 1500                    | △          |

(51) Int. Cl.
*H01M 8/0215* (2016.01)
*H01M 8/0228* (2016.01)
*H01M 8/0267* (2016.01)
*H01M 8/0271* (2016.01)
*H01M 8/0284* (2016.01)

(52) U.S. Cl.
CPC ....... *H01M 8/0267* (2013.01); *H01M 8/0271* (2013.01); *H01M 8/0284* (2013.01); *Y02P 70/56* (2015.11)

(56) References Cited

U.S. PATENT DOCUMENTS

| | | |
|---|---|---|
| 2003/0003345 A1 | 1/2003 | Ohara et al. |
| 2009/0035643 A1* | 2/2009 | Terada .................. H01M 8/021 429/483 |
| 2009/0104494 A1 | 4/2009 | Quadakkers et al. |
| 2009/0130522 A1* | 5/2009 | Akikusa .............. H01M 8/0228 429/425 |
| 2010/0233576 A1 | 9/2010 | Brandner et al. |
| 2011/0294042 A1* | 12/2011 | Kim ..................... C22C 38/001 429/516 |
| 2013/0040220 A1* | 2/2013 | Kim ........................ C22C 38/18 429/468 |

FOREIGN PATENT DOCUMENTS

| | | | |
|---|---|---|---|
| JP | 2002270196 A | | 9/2002 |
| JP | 2002313355 A | * | 10/2002 |
| JP | 4485552 B2 | | 6/2010 |
| JP | 2012182142 A | | 9/2012 |

OTHER PUBLICATIONS

Kerber et al., Stainless Steel Surface Analysis, Advanced Materials & Processes, Nov. 2000. accessed from http://www.materialinterface.com/wp-content/uploads/2014/11/Stainless-steel-review-Matl-Interface.pdf on Jan. 30, 2017.*
English translation of JP 2002-313355 A.*
Search Report dated Oct. 16, 2014 issued over the corresponding German Patent Application 10 2014 205 512.1 with the English translation thereof.
Office Action dated Jul. 21, 2016 issued over the corresponding German Patent Application No. 102014205512.1 with the English translation.

* cited by examiner

FIG. 7

| No. | Sum of Fe and Ni ratios [% by weight] | Peeling start time [hr] | Evaluation |
|---|---|---|---|
| 1 | 3 | 3000 | ○ |
| 2 | 5 | 2500 | ○ |
| 3 | 8 | 1800 | △ |
| 4 | 10 | 1600 | △ |
| 5 | 13 | 1500 | △ |

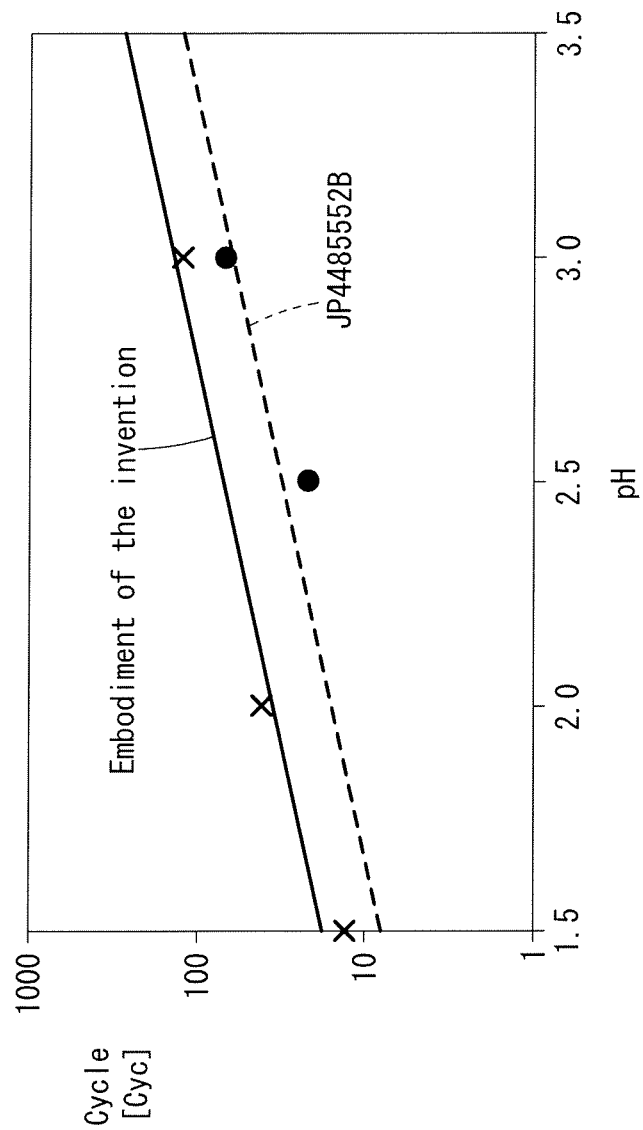

FUEL CELL SEPARATOR AND METHOD FOR PRODUCING THE SAME

CROSS-REFERENCE TO RELATED APPLICATIONS

This application is based upon and claims the benefit of priority from Japanese Patent Applications No. 2013-075301 filed on Mar. 29, 2013 and No. 2014-034185 filed on Feb. 25, 2014, the contents all of which are incorporated herein by reference.

BACKGROUND OF THE INVENTION

Field of the Invention

The present invention relates to a separator for use in a unit cell of a fuel cell having an electrolyte electrode assembly, and further relates to a method for producing the separator.

Description of the Related Art

In general, a fuel cell has a unit cell containing a pair of separators and an electrolyte electrode assembly sandwiched therebetween. In the unit cell, sealants, which contain a stack of a primer and a rubber, are disposed on the edges of both surfaces of the separators. Thus, the sealants are interposed between the separators or between the separator and the electrolyte electrode assembly.

In operation of the fuel cell, a fuel gas containing hydrogen is supplied to an anode, and an oxygen-containing gas is supplied to a cathode in the electrolyte electrode assembly. The sealants act to prevent leakage of the fuel gas and the oxygen-containing gas to the outside of the fuel cell.

For example, the separator is produced by press-forming a metal material such as a stainless steel. A silicone rubber has been widely used as the rubber in the sealant. The silicone rubber is highly elastic and easily compatible with swelling and shrinkage of the stack at the start and stop of the fuel cell. Furthermore, the silicone rubber maintains the elasticity even at a sub-zero temperature, and can act to prevent the leakage of the reactant gas even in a cold region. Thus, the silicone rubber is suitable for use in a vehicle fuel cell.

As described above, the primer is interposed between the rubber and the separator. The primer acts to achieve a satisfactory adhesion strength between the rubber and the separator.

However, the silicone rubber is not sufficient in acid resistance. In general, an electrolyte membrane in the electrolyte electrode assembly has a high acidity. Therefore, it is pointed out that the sealant (the silicone rubber therein) may be deteriorated and the elasticity may be lowered in the vicinity of the electrolyte membrane. Also the adhesion between the primer and the metal may be deteriorated by acid, and thus the sealant may be peeled off from the separator.

In view of solving this problem, the applicant has proposed a Cr-rich layer formed on the surface of the separator in Japanese Patent No. 4485552. In the case of using the Cr-rich layer, the primer is strongly bonded to the separator, so that the sealant is hardly peeled from the separator.

SUMMARY OF THE INVENTION

A principal object of the present invention is to provide a separator for a fuel cell capable of preventing peeling of a sealant containing a stack of a primer and a rubber over a longer period.

Another object of the present invention is to provide a method for producing the above-mentioned separator.

According to an aspect of the present invention, there is provided a separator comprising a metal for use in a unit cell of a fuel cell having an electrolyte electrode assembly containing an anode, a cathode, and an electrolyte interposed therebetween.

The fuel cell separator has a seal forming portion, and a sealant is disposed between the seal forming portion and another separator or between the seal forming portion and the electrolyte electrode assembly.

The outermost surface of the seal forming portion contains, based on 100% by weight of the total of a Cr oxide, an Mo oxide, an Fe oxide, Fe, and Ni, 60% by weight or more of the Cr oxide and 5% by weight or less of the sum of the Fe and Ni.

The composition ratios can be measured by an analyzer such as an X-ray photoelectron spectroscopic analyzer (XPS).

The fuel cell separator and a primer in the sealant have hydroxyl groups (—OH groups) on the outermost surfaces. The hydroxyl groups are hydrogen-bonded to each other, whereby the fuel cell separator and the primer are strongly connected.

On the outermost surface of the fuel cell separator, the hydroxyl groups are bonded mainly to the Cr oxide and Fe oxide. In contrast, the hydroxyl groups are hardly bonded to the Fe and Ni. Therefore, when the composition ratios of the Fe and Ni are reduced to 5% by weight or less in total, and the composition ratios of the Cr oxide and Fe oxide are relatively increased, the number of the hydrogen bonds can be increased.

Furthermore, the Cr oxide is more corrosion-resistant than the Fe oxide, whereby the fuel cell separator is hardly corroded. In other words, metal components are hardly eluted from the fuel cell separator. Therefore, the hydroxyl groups on the outermost surface of the separator are hardly lost, so that the number of the hydrogen bonds is hardly reduced between the separator seal forming portion and the primer, and therefore between the seal forming portion and the primer.

In addition, the hydrogen bonds between the hydroxyl groups on the Cr oxide and the hydroxyl groups on the primer are stronger than those between the hydroxyl groups on the Fe oxide and the hydroxyl groups on the primer.

In the present invention, since the fuel cell separator contains the Cr oxide at the high composition ratio of 60% by weight or more, a large number of the strong hydrogen bonds can be formed, and the number of the hydrogen bonds is hardly reduced. For the foregoing reasons, the primer can be strongly bonded to the seal forming portion of the separator, and the peeling of the primer from the separator can be prevented over a long period. The sealant contains a rubber in addition to the primer, and the rubber is strongly connected to the primer via a covalent bond or the like. Thus, the bonding between the separator and the primer and the bonding between the primer and the rubber can be maintained over a long period. Consequently, the sealant can be desirably fixed to the separator.

The sum of the composition ratios of the Fe and Ni is preferably 3% by weight or less. On the other hand, the composition ratio of the Cr oxide is preferably 70% by weight or more. In either case, the above-described advantageous effects can be further improved.

According to another aspect of the present invention, there is provided a method for producing a separator containing a metal. The separator is for use in a unit cell of a fuel cell having an electrolyte electrode assembly containing an anode, a cathode, and an electrolyte interposed therebetween. The separator has a seal forming portion, and a sealant is disposed between the seal forming portion and another separator or between the seal forming portion and the electrolyte electrode assembly.

The method comprises the steps of: immersing a separator sheet in an acidic liquid to remove a passive film from a surface of the separator sheet; washing the separator sheet with water; heating the washed separator sheet coated with the water; and subjecting the separator sheet to an electrolytic treatment to produce the separator.

In the produced fuel cell separator, the outermost surface of the seal forming portion contains, based on 100% by weight of the total of a Cr oxide, an Mo oxide, an Fe oxide, Fe, and Ni, 60% by weight or more of the Cr oxide and 5% by weight or less of the sum of the Fe and Ni.

The fuel cell separator can be easily produced by the method such that the sum of the composition ratios of the Fe and Ni is 5% by weight or less and the composition ratio of the Cr oxide is 60% by weight or more in the outermost surface of the seal forming portion. The primer can be strongly bonded to the separator and hardly peeled off over a long period, whereby the primer and rubber (the sealant) can be maintained over a long period.

After the separator sheet is taken out from the acidic liquid, the separator sheet wetted with the acidic liquid is directly water-washed. Thus, the separator sheet is coated with the acidic liquid after taken out from the acidic liquid before washed by the water. Therefore, the surface of the separator sheet is prevented from being exposed to the air and dried.

A heating source used in the heating step is preferably controlled at a temperature of 250° C. or higher, more preferably controlled at a temperature of 280° C. or higher, before the heating step. After the water washing, the separator sheet coated with the water is directly heated. Therefore, the surface of the separator sheet is not exposed to the air (atmosphere) after the water washing before the heating.

An aqueous ferric chloride solution is preferably used as the acidic liquid. This aqueous solution is chemically stable over a long period. Therefore, the aqueous solution can be continuously used for removing the passive film.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 7 is a table showing the relationship between the sum of Fe and Ni composition ratios in each separator and the start time of peeling of a sealant containing a primer and a rubber from the separator; and FIG. 8 is a graph showing results of peeling tests of a sealant on a separator according to this embodiment and a sealant on a separator produced by a method described in Japanese Patent No. 4485552.

DESCRIPTION OF THE PREFERRED EMBODIMENTS

A preferred embodiment of the fuel cell separator of the present invention will be described in detail below in relation to a method for producing the same with reference to accompanying drawings. The fuel cell separator is referred to also simply as the separator.

Figure 1:
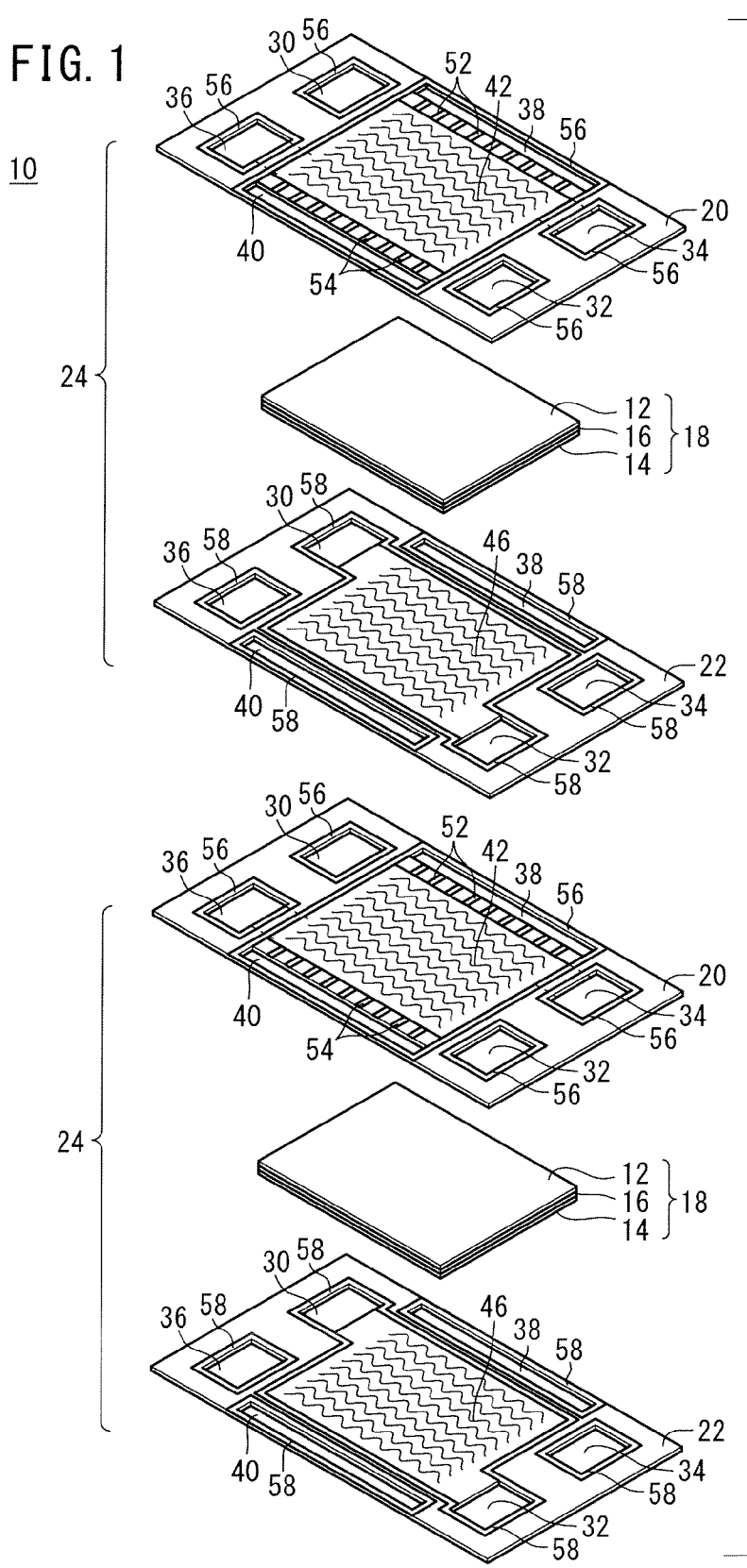
FIG. 1 is an explanatory, schematic, exploded perspective view of a stack having unit cells containing fuel cell separators according to an embodiment of the present invention.
Figure 2:
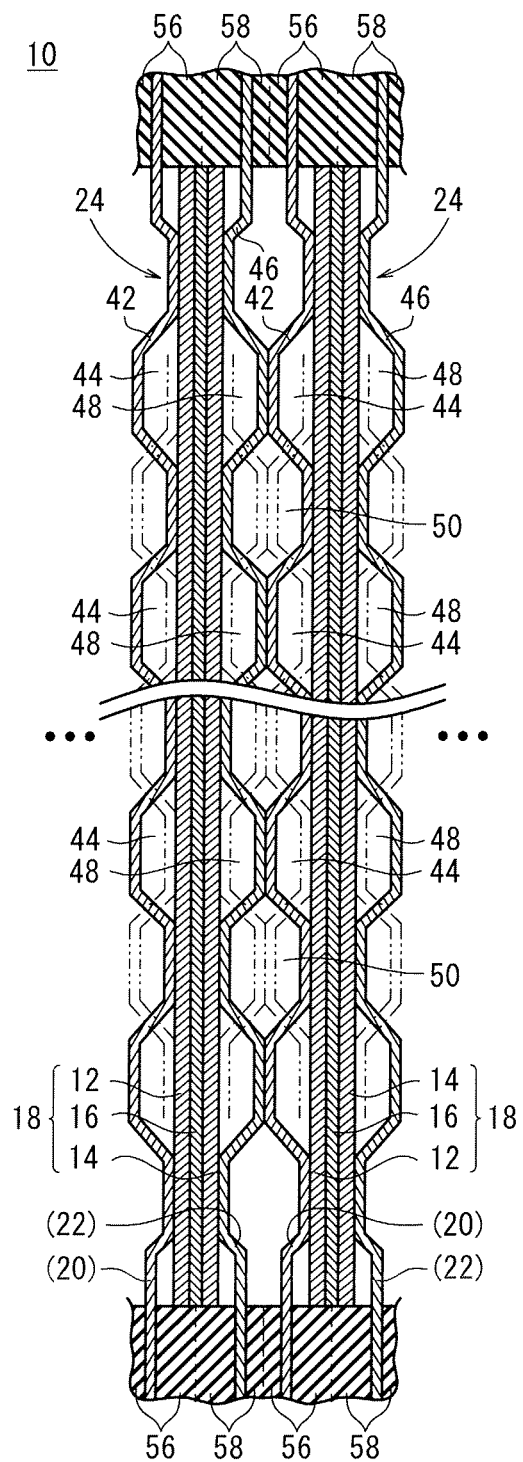
FIG. 2 is an explanatory, schematic, longitudinal sectional view of the stack of FIG. 1.

FIGS. 1 and 2 are an explanatory, schematic, exploded perspective view and an explanatory, schematic, longitudinal sectional view of a stack 10 in a fuel cell according to this embodiment respectively.

The stack 10 has unit cells 24, and each of the unit cells 24 contains a first separator 20, a second separator 22, and an electrolyte electrode assembly 18 sandwiched therebetween. The electrolyte electrode assembly 18 is prepared by interposing an electrolyte 16 between an anode 12 and a cathode 14. In this embodiment, the first separator 20 and the second separator 22 each contain a stainless steel such as SUS304 or SUS316 (according to Japanese Industrial Standards, throughout the following description).

In the stack 10, the anode 12 and the cathode 14 each contain a gas diffusion layer facing the electrolyte 16, and further contain an electrode catalyst layer connected to the gas diffusion layer. Such structures of the anode 12 and the cathode 14 are well known. Therefore, the structures are not shown in the drawings, and detailed explanations thereof are omitted.

The electrolyte 16 contains a proton-conductive resin. For example, NAFION (trade name, available from Du Pont) is known as the resin.

As shown in FIGS. 1 and 2, in each of the first separator 20 and the second separator 22, a first gas inlet 30 for supplying an oxygen-containing gas is formed at the upper left corner, and a first gas outlet 32 for discharging an unconsumed oxygen-containing gas is formed at the diagonal position, i.e., the lower right corner. Similarly, a second gas inlet 34 for supplying a fuel gas is formed at the upper right corner, and a second gas outlet 36 for discharging an unconsumed fuel gas is formed at the diagonal position, i.e., the lower left corner.

Further, a coolant inlet 38 extending between the first gas inlet 30 and the second gas inlet 34 and a coolant outlet 40 extending between the second gas outlet 36 and the first gas outlet 32 are formed in each of the first separator 20 and the second separator 22.

A corrugated fuel gas passage area 42 formed by alternate projections and depressions extends windingly in a wavy manner on the surface of the first separator 20 facing the anode 12, so that the fuel gas can be supplied to and discharged from the anode 12. As shown in FIG. 2, the depressions of the fuel gas passage area 42 are separated from the anode 12. Therefore, hollow portions 44 are formed between the fuel gas passage area 42 and the anode 12, and the fuel gas flows through the hollow portions 44.

Similarly, a corrugated oxygen-containing gas passage area 46 is formed on the second separator 22. The shape of the corrugated oxygen-containing gas passage area 46 is opposite to that of the fuel gas passage area 42 on the first separator 20. The oxygen-containing gas passage area 46 has depressions depressed away from the cathode 14. Therefore, the bottom of the oxygen-containing gas passage area 46 is partially separated from the cathode 14, hollow portions 48 (see FIG. 2) are formed between the oxygen-containing gas passage area 46 and the cathode 14, and the oxygen-containing gas flows through the hollow portions 48.

The fuel gas passage area 42 on the first separator 20 and the oxygen-containing gas passage area 46 on the second separator 22 have the opposite shapes. Therefore, the top surfaces of the fuel gas passage area 42 and the oxygen-containing gas passage area 46 are positioned away from each other to form through passages 50. A coolant flows from the coolant inlet 38 through the through passages 50 to the coolant outlet 40.

In each of the first separator 20 and the second separator 22, branch passages 52 branched from the coolant inlet 38 toward the through passages 50 and collection passages 54 for collecting the coolant from the through passages 50 into the coolant outlet 40 are formed (see FIG. 1).

Figure 3:
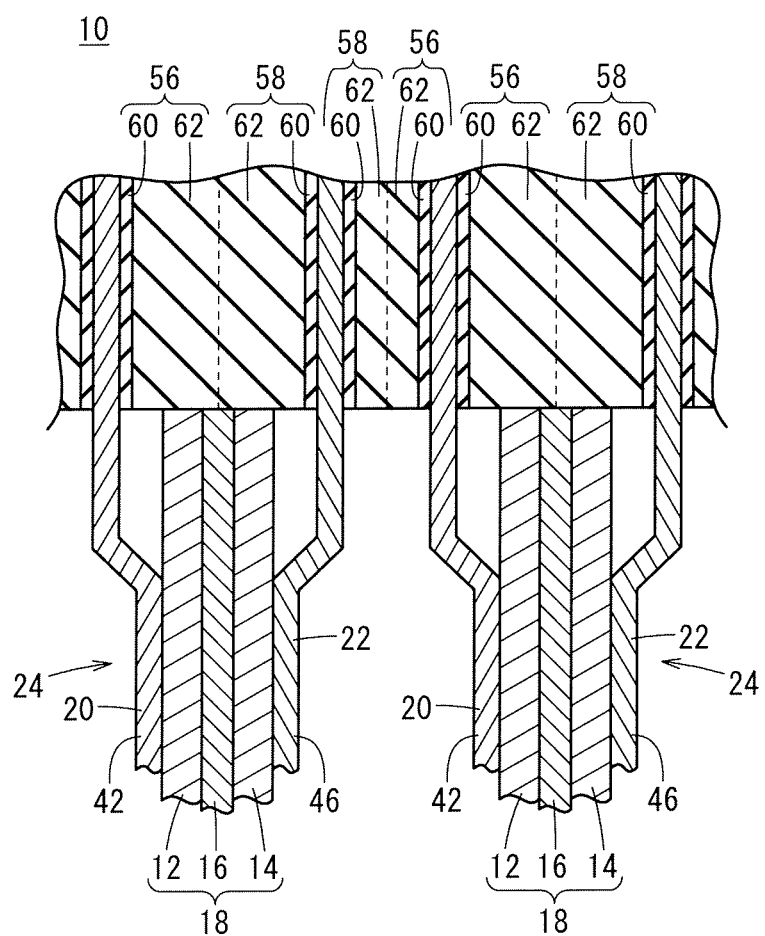
FIG. 3 is a schematic, enlarged, cross-sectional view of seal forming portions and sealants.

On the both surfaces of the first separator 20 and the second separator 22, first sealants 56 and second sealants 58 are formed around the first gas inlets 30, the first gas outlets 32, the second gas inlets 34, the second gas outlets 36, the coolant inlets 38, the coolant outlets 40, the branch passages 52, and the collection passages 54 respectively. As shown in FIG. 3, each of the first sealants 56 and the second sealants 58 is a stack of a primer 60 and a rubber 62. Thus, in the unit cell 24 the rubber sealant is disposed between the seal forming portion and another separator at least at a location surrounding a flow path or passage for a coolant, or between the seal forming portion and the electrolyte membrane electrode assembly at least at a location surrounding a flow path or passage for a reactant gas.

First, the primer 60 is applied to each seal forming portion in the first separator 20 and the second separator 22. For example, the material of the primer 60 is preferably a silicone resin material containing a silane coupling agent.

Next, the rubber 62 is disposed on the primer 60, whereby the first sealant 56 or the second sealant 58 is formed on the seal forming portion. For example, the material of the rubber 62 is preferably a silicone rubber.

Then, the second sealant 58 is stacked on the first sealant 56, so that the first sealant 56 and the second sealant 58 are interposed between the first separator 20 and the second separator 22. Furthermore, the first sealant 56 and the second sealant 58 are interposed between the first separator 20 and the electrolyte electrode assembly 18 and between the electrolyte electrode assembly 18 and the second separator 22 respectively.

In this structure, in the outermost surfaces of the first separator 20 and the second separator 22, based on 100% by weight of the total of a Cr oxide, an Mo oxide, an Fe oxide, Fe, and Ni, the sum of the Fe ratio and the Ni ratio is 5% by weight or less over the entire outermost surfaces including the seal forming portions. A passive film having a thickness of about 2 to 15 nm is substantially formed on the outermost surfaces of the first separator 20 and the second separator 22.

The silane coupling agent used in the primer 60 has an epoxy group and an Si—H group. The epoxy group is opened in the process of hardening the primer 60 to form a hydroxyl (OH) group. The hydroxyl groups derived from the epoxy groups are hydrogen-bonded to the hydroxyl groups on the outermost surfaces of the first separator 20 and the second separator 22, whereby the primers 60 are strongly connected to the first separator 20 and the second separator 22.

On the first separator 20, the hydroxyl groups are bonded mainly to the Cr oxide and Fe oxide. In contrast, the hydroxyl groups are hardly bonded to the Fe and Ni. Therefore, the Cr oxide and Fe oxide contribute significantly to the adhesion between the first separator 20 and the primer 60, and the Fe and Ni contribute less to the adhesion between the first separator 20 and the primer 60.

In this embodiment, in the outermost surface of the first separator 20, the composition ratios of the Fe and Ni are reduced to 5% by weight or less in total, and the composition ratios of the Cr oxide and Fe oxide are relatively increased. Therefore, the outermost surface of the first separator 20 has a large number of the hydroxyl groups, whereby the number of the hydrogen bonds is increased between the first separator 20 and the primer 60. Incidentally, the sum of the composition ratios of the Fe and Ni is more preferably 3% by weight or less.

The outermost surface of the first separator 20 contains 60% by weight or more of the Cr oxide based on 100% by weight of the total of the Cr oxide, Mo oxide, Fe oxide, Fe, and Ni. As compared with Fe, Cr has a lower electronegativity and more readily releases an electron. Therefore, electrons are supplied more readily to the hydrogen bonds between the hydroxyl groups on the Cr oxide and the hydroxyl groups on the primer 60 than to the hydrogen bonds between the hydroxyl groups on the Fe oxide and the hydroxyl groups on the primer 60. Thus, the hydroxyl groups on the Cr oxide and the hydroxyl groups on the primer 60 are more strongly hydrogen-bonded.

Further, the Cr oxide is more corrosion-resistant than the Fe oxide. Therefore, the first separator 20 is hardly corroded, so that the hydroxyl groups on the outermost surface of the first separator 20 are hardly lost.

For the above reasons, the primer 60 is strongly bonded to the outermost surface of the first separator 20 containing a large amount of the Cr (Cr oxide). In other words, the primer 60 is hardly peeled off from the first separator 20. Therefore, the adhesion between the first separator 20 and the primer 60 can be maintained over a long period as described hereinafter. Of course, similarly, the adhesion between the second separator 22 and the primer 60 can be maintained.

For example, the rubber 62 containing the silicone rubber or the like may have a vinyl group. A covalent bond can be formed between the vinyl group in the rubber 62 and the Si—H group in the primer 60, as observed in a hardening reaction of an addition-type silicone rubber. Therefore, the rubber 62 is strongly bonded to the primer 60.

The rubber 62 is desirably fixed to the first separator 20 or the second separator 22 with the primer 60 interposed therebetween in this manner.

In operation of the fuel cell containing the first separator 20 and the second separator 22 having such structures, after the fuel cell is heated to a predetermined temperature, the fuel gas such as a hydrogen-containing gas is supplied from the second gas inlet 34 through the hollow portions 44 to the anode 12, and the oxygen-containing gas such as air is supplied from the first gas inlet 30 through the hollow portions 48 to the cathode 14. Electrode reactions proceed in the presence of the reactant gases in the electrodes 12, 14. In the operation of the fuel cell, the coolant (such as cooling water) is supplied from the coolant inlet 38 and the branch passages 52 and flows through the through passages 50, whereby the unit cell 24 (i.e. the electrolyte electrode assembly 18, the first separator 20, and the second separator 22) is cooled by the coolant.

The unconsumed fuel gas and the unconsumed oxygen-containing gas are discharged through the second gas outlet 36 and the first gas outlet 32 to the outside of the stack 10 respectively. The coolant, which has cooled the unit cell 24 by flowing from the branch passages 52 and passing through the through passages 50, is collected through the collection passages 54 into the coolant outlet 40, and then discharged from the coolant outlet 40 to the outside of the stack 10.

In this operation of the fuel cell, $H_2O$ (generally water vapor) is generated by the electrode reactions. The $H_2O$ may be in the state of an acidic mixture containing an acid from the electrolyte 16 in some cases. The acidic water vapor containing the acid will be described below.

The acidic water vapor is transferred together with the unconsumed oxygen-containing gas or fuel gas to the second gas outlet 36 or the first gas outlet 32.

The primers 60 are significantly strongly bonded to the rubbers 62 in the first sealants 56 and the second sealants 58 around the first gas inlets 30, the first gas outlets 32, the second gas inlets 34, and the second gas outlets 36. Therefore, the acidic water vapor is not introduced between the primers 60 and the rubbers 62.

The outermost surfaces of the first separator 20 and the second separator 22 contain high composition ratios of the Cr oxide and Fe oxide having the hydroxyl groups. Therefore, a large number of the hydrogen bonds of the primers 60 are formed on the first separator 20 and the second separator 22. Thus, even in a case where the first separator 20 or the second separator 22 is attacked by the acidic water vapor, whereby a certain number of the hydrogen bonds are cleaved, the adhesion of the primers 60 to the first separator 20 or the second separator 22 is maintained by the remaining hydrogen bonds.

Furthermore, the outermost surfaces of the first separator 20 and the second separator 22 contain a large amount of the Cr oxide. The hydrogen bonds between the hydroxyl groups on the Cr oxide and the hydroxyl groups on the primers 60 are stronger than those between the hydroxyl groups on the Fe oxide and the hydroxyl groups on the primers 60.

In addition, since the outermost surfaces of the first separator 20 and the second separator 22 contain a large amount of the Cr oxide (i.e. Cr), the composition ratio of the Fe oxide (Fe) is relatively lowered. Therefore, the first separator 20 and the second separator 22 have an excellent corrosion resistance, and the metal components are hardly eluted to the acidic water vapor. In other words, the hydroxyl groups on the outermost surfaces of the first separator 20 and the second separator 22 are hardly lost.

For these reasons, the primers 60 are prevented from being separated from the first separator 20 and the second separator 22 over a long period. Thus, the primers 60, the first sealants 56, and the second sealants 58 are hardly peeled off from the first separator 20 and the second separator 22. Consequently, the first sealants 56 and the second sealant 58 can be fixed to the first separator 20 and the second separator 22 over a long period.

The generated water is rapidly transferred from the first gas inlet 30 or the second gas inlet 34 toward the first gas outlet 32 or the second gas outlet 36, and then readily discharged to the outside of the stack 10 together with the oxygen-containing gas or the fuel gas.

A method for producing the first separator 20 and the second separator 22 will be described below using an example of the first separator 20.

First, a separator sheet for the first separator 20 is alkali-washed and degreased. The alkali washing is carried out if necessary, and may be omitted.

Figure 4:
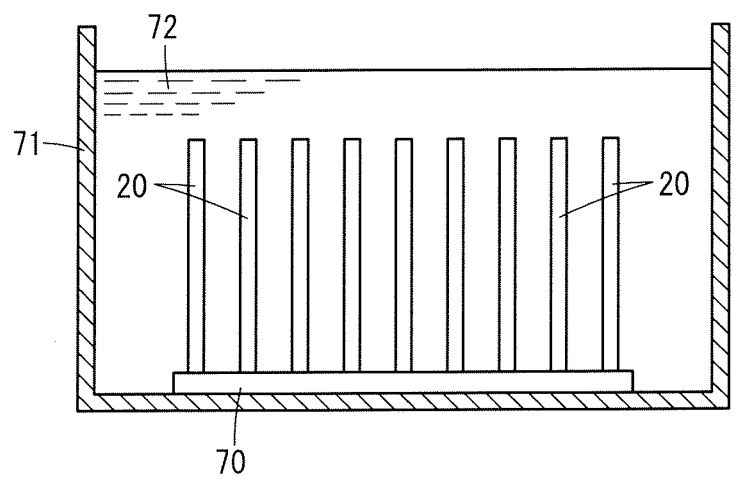
FIG. 4 is a schematic, longitudinal sectional view of separator sheets immersed in an acidic liquid.

As shown in FIG. 4, a plurality of the separator sheets (the first separators 20) are fixed to a holder jig 70 and immersed in an acidic liquid 72 in a first immersion bath 71. The acidic liquid 72 may contain nitric acid or the like. In particular, the acidic liquid 72 is preferably an aqueous ferric chloride solution, which has a high stability, is not chemically changed for a long period, and is capable of treating both surfaces of the separator sheet uniformly.

The separator sheet (the first separator 20) is composed of a stainless steel, and has a passive oxide film on the surface. When the separator sheet is immersed in the acidic liquid 72, the base metal is eluted, whereby the passive film is removed. As a result, the metal is exposed on the surface of the separator sheet.

Figure 5:
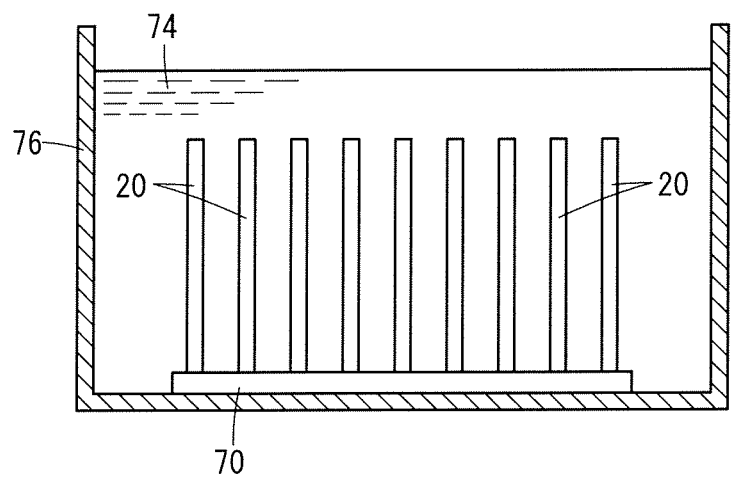
FIG. 5 is a schematic, longitudinal sectional view of the separator sheets washed with pure water.

As shown in FIG. 5, the separator sheets (the first separators 20) with the metal exposed on the surfaces are transferred together with the holder jig 70 from the first immersion bath 71 to a second immersion bath 76 containing a pure water 74. The separator sheets are transferred using a conveyer. The separator sheets wetted (i.e. coated) with the acidic liquid 72 are directly introduced into the pure water 74. Thus, as the separator sheets are transferred in a short time, the surfaces of the separator sheets are prevented from being exposed to the air (atmosphere) during the transfer.

Figure 6:
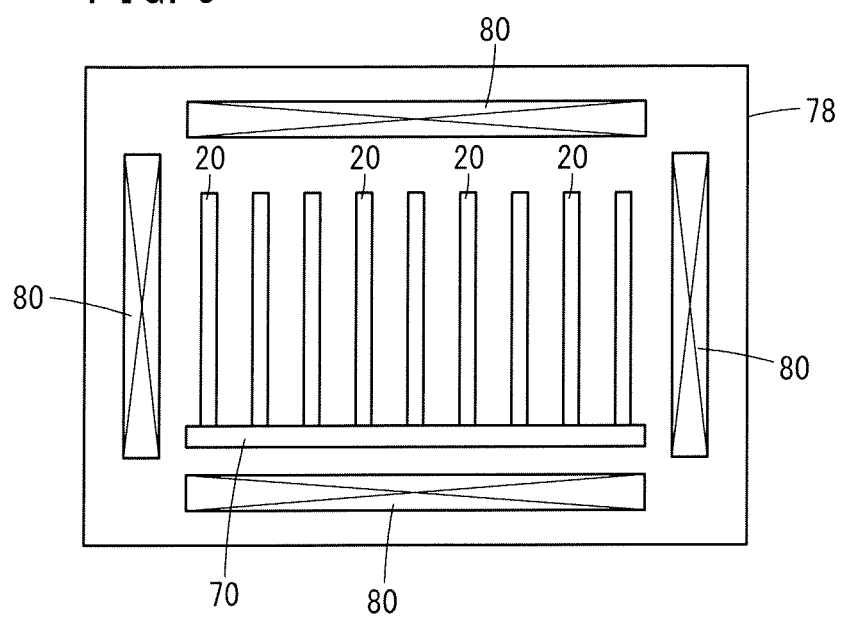
FIG. 6 is a schematic, longitudinal sectional view of the separator sheets heated.

The acidic liquid 72 attached to the separator sheets (the first separators 20) is removed by the washing with the pure water 74. Then, the separator sheets are taken out from the pure water 74, and transferred together with the holder jig 70 to an oven 78 shown in FIG. 6. As shown in FIG. 6, the oven 78 has heaters 80.

The separator sheets (the first separators 20) are still wetted with the pure water 74 after the transfer. Thus, the pure water 74 is interposed between the separator sheets and air. In other words, the surfaces of the separator sheets are coated with the pure water 74 and shielded from the air. Therefore, as the separator sheets are transferred in a short time, the passive film is inhibited from regenerating on the separator sheets during the transfer.

As the transfer time of the separator sheets (the first separators 20) from the first immersion bath 71 to the second immersion bath 76 and the transfer time from the second immersion bath 76 to the oven 78 (i.e. the times for which the separator sheets are in the air) are shortened, the composition ratios of the Fe and Ni are lowered, and the composition ratios of the Fe oxide and Cr oxide are relatively increased. For this reason, the transfer times (the exposure times in the air) of the separator sheets are preferably 35 seconds or less. In this case, the sum of the composition ratios of the Fe and Ni can be lowered to 3% by weight or less. The transfer times (the exposure times in the air) are most preferably 30 seconds or less.

The separator sheets (the first separators 20) coated with the pure water 74 are placed in the oven 78 or the like and then heated. The oven 78 is controlled preferably at a temperature of 250° C. or higher, more preferably at a temperature of 280° C. or higher, before the placing. Thus, the separator sheets are heated immediately after the placing in the oven 78. For example, the separator sheets may be heated at 280° C. for 15 minutes.

In the heating step, the pure water 74 is rapidly vaporized, and an active metal is exposed on the surface of the separator sheet (the first separator 20). Because the oven 78 contains air, most of the constituent elements Fe, Cr, and Mo in the separator sheet (stainless steel) are rapidly oxidized to generate the passive film containing the Fe oxide, Cr oxide, and Mo oxide. Meanwhile, the Fe is moved closer to the surface (the passive film) that is closer to the heating source. Therefore, an Fe-rich layer having a high Fe oxide content is formed on the surface of the separator sheet. In this step, the composition ratio of the Cr oxide in the Fe-rich layer is about 10% to 20% by weight.

Since the Fe is moved closer to the surface, the composition ratio of the Cr oxide is relatively increased inside the separator sheet (the first separator 20). Therefore, a Cr-rich layer having a Cr oxide content of 60% by weight or more is formed inside the separator sheet.

Then, the separator sheets (the first separators 20) are subjected to an electrolytic treatment. A phosphoric acid aqueous solution having a concentration of 10% may be used in an electrolytic bath for the electrolytic treatment. In this case, the temperature of the electrolytic bath may be about 50° C., and the current density may be about 15 mA/cm$^2$. The Fe-rich layer is removed by the electrolytic treatment, whereby the Cr-rich layer is exposed. Thus, the resultant outermost surface contains 60% by weight or more of the Cr oxide.

The first separator 20 can be produced by the method such that the outermost surface contains 5% by weight or less of the Fe and Ni in total and 60% by weight or more of the Cr oxide. In the first separator 20, also the outermost surfaces of the seal forming portions contains 5% by weight or less of the Fe and Ni and 60% by weight or more of the Cr oxide.

The primers 60 are applied to the first separator 20, and then baked. The rubbers 62 are injection-molded and hardened by heating to form the first sealants 56.

It is to be understood that the second separator 22 having the second sealants 58 can be produced in the same manner as above.

The unit cell 24 may be prepared by interposing the electrolyte electrode assembly 18 between the produced first separator 20 and second separator 22. Furthermore, the stack 10 may be produced by stacking a predetermined number of the unit cells 24.

Though a plurality of the separator sheets (the first separators 20 or the second separators 22) are fixed to the holder jig 70 such that the surfaces extend in the vertical direction in FIGS. 4 to 6, the separator sheets may be placed such that the surfaces extend in the horizontal direction. In this case, a rack or the like suitable for the placing may be used as the holder jig.

EXAMPLE 1

A separator was prepared from SUS316. The separator was alkali-washed and immersed in an aqueous ferric chloride solution to remove a passive film. Then, the separator was taken out from the aqueous ferric chloride solution, washed with a pure water, and left in an air for a predetermined time.

The separator wetted with the pure water was heated by an oven at 280° C. for 15 minutes. Then, the separator was subjected to an electrolytic treatment using an aqueous phosphoric acid solution having a concentration of 10% and a temperature of 50° C. under a current density of 15 mA/cm$^2$.

After the above steps, composition ratios of the outermost surface (the passive film) of the separator were measured by XPS. In cases where the separator was left in the air for 35, 40, or 50 seconds after taken out from the aqueous ferric chloride solution before the heating, the sum of the composition ratios of the Fe and Ni was 3%, 5%, or 8% by weight respectively. Furthermore, in cases where the separator was left in the air for 60 or 120 seconds, the sum of the composition ratios of the Fe and Ni was 10% or 13% by weight respectively. The separator having the sum of 3% by weight contained trace of unoxidized Fe and a larger amount of unoxidized Ni.

The composition ratio of the Cr oxide was 60% by weight or more regardless of the immersion time. When the sum of the Fe and Ni was 3% by weight, the composition ratio of the Cr oxide was more than 70% by weight. Incidentally, the total ratio of the Cr oxide, Fe oxide, and Mo oxide was approximately 97% by weight.

A primer No. 101A/B available from Shin-Etsu Chemical Co., Ltd. (a silicone rubber containing a silane coupling agent/a metal adhesive) was applied to the separator and baked at 160° C. for 1 hour.

A two-pack-hardening, addition-type dimethyl silicone rubber KE-1950A/B available from Shin-Etsu Chemical Co., Ltd. was injection-molded on the primer, pre-hardened at 150° C. for 40 seconds, and hardened at 200° C. for 3 hours.

The separator having the sealant (a stack of the primer and the rubber) was immersed in an aqueous sulfuric acid having a temperature of 95° C. and pH of 2. The time until the rubber was started to be peeled off together with the primer from the separator was measured. The measured peeling start times are shown in FIG. 7 in relation to the sum of the Fe and Ni.

As shown in FIG. 7, it is clear that when the sum of the Fe and Ni is 5% by weight or less, the time until the primer and the rubber (the sealant) is peeled off is prolonged to 2000 hours or more, and thus the sealant is maintained on the separator over a long period.

EXAMPLE 2

A pair of the separators having the sealants were produced in the same manner as above. An electrolyte electrode assembly was interposed between the separators to form a unit cell. An acidic liquid was added to a gas passage area of each separator. A coolant having a temperature of 10° C. was flowed in a coolant passage of each separator, and then the coolant was replaced by a warming medium having a temperature of 90° C., whereby the temperature of the unit cell was changed from the ambient temperature closer to the power generation temperature. The coolant and the warming medium were each circulated for 30 minutes.

The circulation of the coolant and the warming medium was carried out in this manner in one cycle. This cycle was repeated multiple times. The cycle number until the sealant was peeled off from the separator was measured. This test was repeatedly carried out using various pH of the acidic liquid.

For comparison, an electrolyte electrode assembly was interposed between separators produced by a method described in Japanese Patent No. 4485552 to produce a unit cell. The acidic liquid was added to a gas passage area of each separator, the coolant and the warming medium were circulated in a coolant passage of the separator, and the cycle number until the sealant was peeled off from the separator was measured, in the same manner as above. This test was repeatedly carried out using various pH of the acidic liquid.

The results are shown in the graph of FIG. 8 in relation to the pH of the acidic liquid. As is clear from FIG. 8, the separator produced by the method of this embodiment exhibits the cycle number (until the sealant is peeled off) larger than that of the comparative separator produced by the method described in Japanese Patent No. 4485552. More specifically, the cycle number of the separator of this embodiment is about 2.5 times larger than that of the comparative separator.

Thus, it is clear that when the outermost surface of the separator (the passive film on the seal forming portion) contains the predetermined composition ratios of the Cr, Fe, and Ni, the sealant (the primer and the rubber) can be maintained on the separator over a longer period.

Although certain preferred embodiments of the present invention have been shown and described in detail, it should be understood that various changes and modifications may be made therein without departing from the scope of the appended claims.

What is claimed is:

1. A separator comprising a metal for use in a unit cell of a polymer electrolyte fuel cell having an electrolyte membrane electrode assembly containing an anode, a cathode, and an electrolyte membrane interposed therebetween, wherein the separator has a seal forming portion and a rubber sealant bonded to the seal forming portion, and the separator is configured such that when the separator is disposed in the unit cell the rubber sealant will be disposed between the seal forming portion and another separator at least at a location surrounding a flow path for a coolant, or between the seal forming portion and the electrolyte membrane electrode assembly at least at a location surrounding a flow path for a reactant gas a layer at an outermost surface of the seal forming portion contains 100% by weight of the total of a Cr oxide, an Mo oxide, an Fe oxide, Fe, and Ni, and of said content 60% by weight or more is the Cr oxide and 5% by weight or less of the sum of the Fe and Ni, so that the layer includes a Cr-rich layer which contains a greater amount of the Cr oxide than a portion underneath the outermost surface of the seal forming portion, and wherein the separator having the outermost surface of the seal forming portion is formed by immersing a stainless steel sheet in an acidic liquid to remove a passive film from a surface of the separator sheet;

washing the separator sheet with water;

heating the washed separator sheet coated with the water; and subjecting the separator sheet to an electrolytic treatment to produce the separator having the outermost surface of the seal forming portion.

2. The separator according to claim 1, wherein the outermost surface contains 3% by weight or less of the sum of the Fe and Ni.

3. The separator according to claim 1, wherein the layer at the outermost surface contains 70% by weight or more of the Cr oxide.

4. A method for producing a separator containing a metal for use in a unit cell of a polymer electrolyte fuel cell having an electrolyte membrane electrode assembly containing an anode, a cathode, and an electrolyte membrane interposed therebetween, wherein the separator has a seal forming portion and a rubber sealant bonded to the seal forming portion, and the separator is configured such that when the separator is disposed in the unit cell the rubber sealant will be disposed between the seal forming portion and another separator at least at a location surrounding a flow path for a coolant or between the seal forming portion and the electrolyte membrane electrode assembly at least at a location surrounding a flow path for a reactant gas, the method comprising the steps of:

immersing a separator sheet in an acidic liquid to remove a passive film from a surface of the separator sheet;

washing the separator sheet with water;

heating the washed separator sheet coated with the water; and subjecting the separator sheet to an electrolytic treatment to produce the separator, wherein an outermost surface of the seal forming portion contains, based on 100% by weight of the total of a Cr oxide, an Mo oxide, an Fe oxide, Fe, and Ni, 60% by weight or more of the Cr oxide and 5% by weight or less of the sum of the Fe and Ni.

5. The method according to claim 4, wherein a heating source controlled at a temperature of 250° C. or higher is used in the step of heating the washed separator sheet.

6. The method according to claim 4, wherein an aqueous ferric chloride solution is used as the acidic liquid.

7. The separator according to claim 1, wherein the separator is formed of stainless steel.

8. The separator according to claim 1, wherein the layer at the outermost surface of the seal forming portion has a thickness of 5 to 20 nm.

9. The separator according to claim 1, wherein the separator is configured for use in the unit cell of the fuel cell having an electrolyte membrane electrode assembly containing a proton-conductive resin electrolyte interposed between the anode and the cathode.

10. The separator according to claim 1, wherein the seal forming portion is defined around the peripheries of flow channels formed through the separator.

11. A unit cell of a polymer electrolyte fuel cell having an electrolyte membrane electrode assembly containing an anode, a cathode, and an electrolyte membrane interposed therebetween, together with at least one separator comprising a metal, wherein the at least one separator has a seal forming portion, a rubber sealant being disposed between the seal forming portion and another separator at least at a location surrounding a flow path for a coolant or between the seal forming portion and the electrolyte electrode assembly separator at least at a location surrounding a flow path for a reactant gas, a layer at an outermost surface of the seal forming portion contains 100% by weight of the total of a Cr oxide, an Mo oxide, an Fe oxide, Fe, and Ni, and of said content 60% by weight or more is the Cr oxide and 5% by weight or less of the sum of the Fe and Ni, so that the layer includes a Cr-rich layer which contains a greater amount of the Cr oxide than a portion underneath the outermost surface of the seal forming portion and wherein the separator having the outermost surface of the seal forming portion is formed by immersing a stainless steel sheet in an acidic liquid to remove a passive film from a surface of the separator sheet;

washing the separator sheet with water;

heating the washed separator sheet coated with the water; and subjecting the separator sheet to an electrolytic treatment to produce the separator having the outermost surface of the seal forming portion.

12. The separator according to claim 1, wherein the rubber sealant is joined to the seal forming portion via a primer, and a hydroxyl group bonded to the Cr oxide contained in the outermost surface of the seal forming portion and a hydroxyl group in the primer are hydrogen-bonded to each other.

13. The unit cell according to claim 11, wherein the rubber sealant is joined to the seal forming portion via a primer, and a hydroxyl group bonded to the Cr oxide contained in the outermost surface of the seal forming portion and a hydroxyl group in the primer are hydrogen-bonded to each other.

* * * * *